Figure 1:
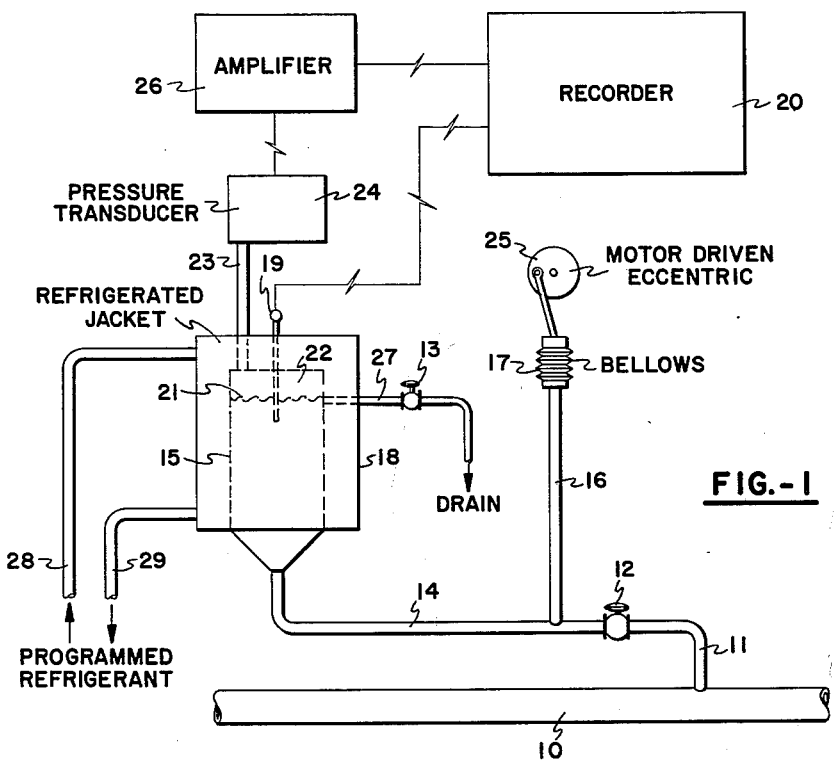

March 3, 1964 G. E. CONKLIN 3,122,911
POUR POINT APPARATUS
Filed Sept. 25, 1961

EXAMPLE OF RECORDING OBTAINABLE FOR POUR
POINT IN A 2 PEN RECORDER

George E. Conklin    INVENTOR

BY David A. Roth

PATENT ATTORNEY

United States Patent Office 3,122,911
Patented Mar. 3, 1964

3,122,911
POUR POINT APPARATUS
George E. Conklin, North Plainfield, N.J., assignor to Esso Research and Engineering Company, a corporation of Delaware
Filed Sept. 25, 1961, Ser. No. 140,456
9 Claims. (Cl. 73—17)

This invention relates to a method for measuring the pour points of liquid compositions and apparatus suitable therefor. In particular, the invention relates to a method of determining pour points by transmitting pulsating pressure impulses through the composition for which a pour point determination is desired.

The method and apparatus described herein is suitable for use with any liquid composition. However, it is particularly applicable to oils, including synthetic lubricating oils, mineral hydrocarbon oils, and fuel oils, since the pour point of these oils is an important aspect of quality evaluation.

Conventionally, pour points of oils are determined by the test identified as ASTM-D-97. Briefly, this test consists in placing a sample of the oil, whose pour point is to be determined, in a stoppered test tube equipped with a thermometer inserted into the test tube so that the bulb of the thermometer is immersed in the oil under test. The tube is then placed in a test apparatus which consists of a bath surrounding the test tube so that, upon a gradual lowering of the temperature bath, the oil under test will also have its temperature lowered. Heretofore, an operator has manually removed the tube containing the oil under test from the bath and tilted the tube to determine the movement of the oil surface under test. This is done, roughly, at 5° F. intervals of temperature lowering, the pour point of the sample being taken as 5° F. above the highest temperature at which the oil ceases to move when the test tube is held in a horizontal position.

In modern day practice in oil refineries, hundreds of the above-described pour point tests are carried out more or less manually and require the constant presence of an operator whose judgment and skill are relied upon for a determination of the pour points. Manipulations are generally made by hand and there is a high variance from sample to sample and from operator to operator so that, for any particular oil under test, the results obtained by several operators may vary as much as 15° F. Therefore there is an extreme lack of reproducibility of results and of accuracy of results using the present ASTM method described.

The advantages of the instant invention are that pour points of oils can be more accurately determined in less time and using fewer man hours, and are, therefore, less expensive.

In essence, the method of determining pour points according to the invention is as follows. An oil or a liquid sample is placed into a container and means, such as a cooling jacket or bath, are applied to said jacket to lower the temperature of the sample at any given rate as, for example, about 1° F. per minute. Energy in the form of a pulsating pressure is then applied to the base of the sample by any convenient means. The amplitude of the pulsating pressure is chosen so that as the fluid sample congeals, the rate of movement of the congealed or congealing sample decreases. The frequency of the pulsating pressure is approximately 5 to 35, preferably 20 to 35 and especially preferred, 30 cycles per minute. Above the liquid sample is an enclosed space filled with a gaseous medium, e.g. air, which is connected to a pressure transducer. There is also a temperature measuring means inserted in the sample so as to determine the temperature at the pour point. As applied pulsating pressures of fixed amplitude are transmitted through a liquid sample, the movement of the surface of the sample against the enclosed gas above it compresses and rarefies said gas causing a fluctuation in the output of the pressure transducer. When the temperature of the sample reaches its pour point the viscosity of the sample has increased so substantially that there is an appreciable difference in the rate of pressure change of the air above the viscous sample as compared with that above the liquid sample in a more fluid state. By either visually observing this change in the rate of pressure change or employing suitable means of automatically recording such change against temperature, the pour point can be obtained. The amplitude of the applied pressure impulses will preferably vary between 0 to 3", e.g. 0 to 1", water pressure above atmospheric pressure. All pressures referred to herein are inches of water above atmospheric pressure. The transmitted pressure impulses measured after passage through the sample will vary in amplitude with respect to the viscosity of the sample. However, the amplitude of the transmitted pressure impulses will aways be somewhat less than that of the amplitude of the applied pressure impulses. For instance, in lubricating oils having a viscosity of approximately 32 to 280 SUS at 210° F., the transmitted pressure impulses will have a maximum amplitude at ambient temperatures of approximately 1" when the applied pressure impules have a maximum amplitude of approximately 3". The pulsating pressure impulses can be provided by any well-known technique, such as a bellows, a plunger and piston, controlled air pressures, and the like. Suitable means for measuring the pressure changes include pressure transducers of the type which convert pressure to a proportional electrical signal which signal is transmitted to a recorder or indicator. Also, pressure transducers which are sensitive mechanical pressure gauges to indicate or record the pressure changes can be used. Temperature measuring apparatus include thermometers as well as thermocouples of the recording or indicating type. The temperature measuring apparatus can be also connected to the recorder so as to automatically indicate pressure change with temperature.

In the drawing, FIG. 1 illustrates a preferred apparatus for automatically determining pour points. This apparatus is suitable for use on a product pipeline and its operation is described.

Figure 2:
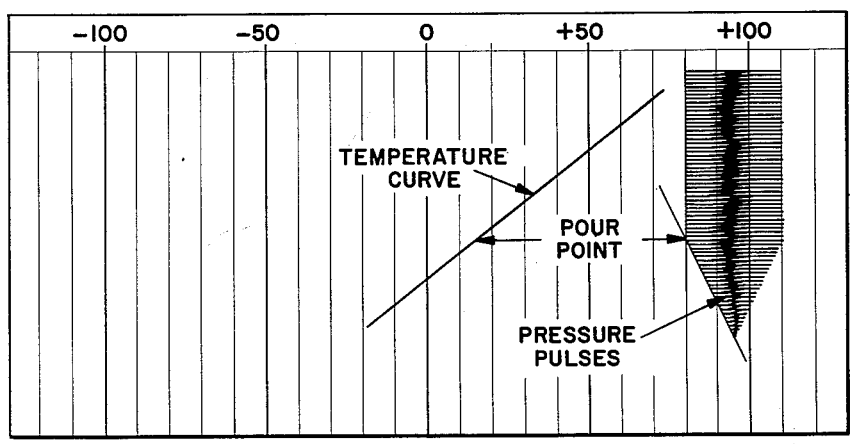

FIG. 2 illustrates a recording from a 2-pen recorder.

Referring now to FIG. 1, from pipeline 10, a sample to be tested is drawn off through line 11 by opening valves 12 and 13 and flowed through line 14 to sample chamber 15 and through line 16 to Sylphon bellows 17. Sample chamber 15 is mounted in cooling jacket 18 which has refrigerant circulating through it. Sample chamber 15 also has thermocouple 19 connected thereto and adjusted so as to penetrate the upper level of the sample to be tested. Thermocouple 19 is connected to recorder 20. The sample in sample chamber 15 is not permitted to exceed level 21 in the sample chamber 15 thus leaving enclosed air space 22 in the sample chamber. Air space 22 is connected through line 23 with pressure transducer 24. The electric signals from pressure transducer 24 are amplified by amplifier 26 and the amplified signals are then transmitted to recorder 20. Sylphon bellows 17 is activated by motorized eccentric cam assembly 25. Sylphon bellows 17 is pulsed at an amplitude which varies from 0 to 3" water pressure above atmospheric and at a frequency of 5 to 30 cycles per minute. As the Sylphon bellows is pulsed the temperature of the sample is lowered at a uniform cooling rate. Refrigerant is circulated through cooling jacket 18 by means of lines 28 and 29. After the pour point is measured for a given sample, the sample is allowed to fluidize and valves 12 and 13 are opened to simultaneously expel old sample and allow new sample to flow into the apparatus as already described.

The old sample flows out through line 27 and valve 13. Sylphon bellows are metal bellows obtainable from the Fulton Sylphon Division of Robert Shaw-Fulton Controls Co. located in Knoxville, Tenn.

Referring now to FIG. 2 a graph recording of signal amplitude vs. temperature is shown. The pour point is at that temperature where the slope of the pressure impulses changes. The numerals at the top of the recording represent degrees Fahrenheit.

Other systems for electrically recording temperatures and for recording the point at which the liquid surface undergoes a change in movement in response to pressure impulses will be obvious to one skilled in the art and can be used.

While the above-described apparatus shows a preferred mode of carrying out the method of the invention, it will be apparent that numerous variations in apparatus details can be employed to carry out the method of the invention. The following example represents an actual embodiment of the above-described apparatus and process.

*Example I*

An apparatus constructed according to FIGURE 1 was used to determine the pour point of an oil sample having an ASTM pour point of −10° F. The main components of the apparatus were as follows with identifying numbers corresponding to those of FIGURE 1.

Sample chamber—a Pyrex tube 20 mm. in diameter and 120 mm. long (15)
Cooling jacket—a 1-liter beaker with an orifice in the bottom through which the sample chamber projected (18)
Coolant—Dry Ice and isopropyl alcohol
Pressure transducer—Decker differential pressure sensor and pressure meter—Model 306. This is made by the Decker Corporation of Bala-Cynwyd, Pa. (24)
Recorder—a two-pen Varian Recorder (20)
Bellows and eccentric cam assembly—part of a research appliance pump. The pump was modified by removing the valves (17, 25).

Pressure impulses having an amplitude starting from a minimum of 0 and building up to a maximum of 3" water pressure at a frequency of about 30 cycles per minute were applied to the oil sample. The sample was cooled at a rate of about 2° F. per minute. Two pour point determinations were made on the same sample using the above-described apparatus and technique. Pour points of −12° F. and −13° F. were obtained. This compared to a −10° F. pour point using the ASTM method.

What is claimed is:
1. A method of determining the pour point of a confined normally liquid body having sides, one of said sides being in contact with an enclosed gaseous medium, which comprises transmitting pulsating pressures having an amplitude of from 0 to 3" of $H_2O$ above atmospheric pressure and a frequency of from 5 to 35 cycles per minute, through said liquid, and measuring the change in pressure amplitude of said gaseous medium with respect to temperature while cooling said liquid body at a rate of from 1 to 3° F. per minute.
2. A method according to claim 1 wherein the temperature of the liquid is lowered at the rate of about 2° F. per minute.
3. A method according to claim 1 wherein said liquid is an oil.
4. A method according to claim 1 wherein the amplitude of said pulsating pressure is 0 to 1 inch of water.
5. A method according to claim 1 wherein the frequency of said pulsating pressure is from 20 to 35 cycles per minute.
6. An apparatus for determining pour points of liquid compositions comprising in combination:
   (a) Container means for said liquid compositions
   (b) Cooling means for said liquid compositions
   (c) Means for applying pressure pulses to said liquid compositions
   (d) Temperature measuring means for said liquid compositions
   (e) Means located in a gaseous medium above said liquid composition for measuring pressure pulses after being transmitted through said compositions by said means for applying pressure pulses.
7. An apparatus for measuring the pour point of liquid compositions comprising in combination:
   (a) A container for said composition
   (b) Means for cooling said composition in said container
   (c) Applied pressure impulse means for transmitting pressure pulses through said composition
   (d) Temperature indicating means for said liquid compositions
   (e) Means located in a gaseous medium above said liquid composition responsive to the change of amplitude of said pressure pulse after transmission through said composition, and
   (f) Means responsive to the latter two foregoing means for determining the pour point of said composition.
8. An apparatus according to claim 7 wherein said means of subparagraph *e* is a recorder.
9. An apparatus for measuring the pour point of liquid compositions comprising in combination:
   (a) a container for said composition,
   (b) means for cooling said composition in said container,
   (c) a Sylphon bellows actuated by an eccentric cam for transmitting pressure pulses through said composition,
   (d) a thermocouple for indicating the temperature of said composition,
   (e) a pressure transducer located in a gaseous medium above said composition, said transducer being responsive to the change of amplitude of said pressure pulses after transmission through said composition, and
   (f) a recorder responsive to said thermocouple and said transducer for determining the pour point of said composition.

References Cited in the file of this patent
UNITED STATES PATENTS 2,938,386    Anderson et al. _____ May 31, 1960
2,952,152    Fisher et al. _____ Sept. 13, 1960